United States Patent
Schaaf et al.

(10) Patent No.: US 8,639,423 B2
(45) Date of Patent: Jan. 28, 2014

(54) POWER SPLIT DEVICE AND METHOD

(75) Inventors: Stuart Schaaf, Houston, TX (US); Sam Akehurst, Bath (GB)

(73) Assignee: Orbital Traction Limited, Houston, TX (US)

(*) Notice: Subject to any disclaimer, the term of this patent is extended or adjusted under 35 U.S.C. 154(b) by 945 days.

(21) Appl. No.: 12/718,849

(22) Filed: Mar. 5, 2010

(65) Prior Publication Data
US 2010/0286876 A1 Nov. 11, 2010

Related U.S. Application Data

(63) Continuation of application No. PCT/GB2008/003017, filed on Sep. 5, 2008.

(30) Foreign Application Priority Data

Sep. 7, 2007 (GB) .................................. 0717354.5

(51) Int. Cl.
F16H 37/06 (2006.01)
(52) U.S. Cl.
USPC ............................................ 701/51; 903/910
(58) Field of Classification Search
USPC ........ 701/51; 475/189, 195, 192, 4, 5, 72, 73, 475/83; 476/37, 38; 903/910, 911; 180/65.22, 65.235, 65.7, 165
See application file for complete search history.

(56) References Cited

U.S. PATENT DOCUMENTS

| 2,175,551 | A | * | 10/1939 | Perry ......................... 242/413.7 |
| 2,773,395 | A | * | 12/1956 | Reibig ............................ 74/333 |
| 3,793,907 | A | | 2/1974 | Nakamura et al. |
| 2005/0113202 | A1 | | 5/2005 | Miller et al. |

FOREIGN PATENT DOCUMENTS

| GB | 1 202 104 | 8/1970 |
| GB | 2 119 041 | 11/1983 |
| GB | 2 339 863 | 2/2000 |
| WO | 99/35417 | 7/1999 |

OTHER PUBLICATIONS

XP0079091115, 2001-01-0874. "Performance Investigations of a Novel Rolling Traction CVT", Akehurst S. et al., University of Bath, http://people.bath.ac.uk/ensejb/milner.pdf, Jan. 1, 2001, 6 pages.

* cited by examiner

*Primary Examiner* — Dalena Tran
(74) *Attorney, Agent, or Firm* — Weide & Miller, Ltd.

(57) ABSTRACT

A variable power split device having radially inner and outer races, each comprising at least two axially spaced parts. A plurality of planetary members are arranged for rolling contact between the races and a planet follower carrier engages the planetary members. A first rotatable power element spindle connects with the planet follower to couple power between the planet follower carrier and a first power element. A second rotatable power element spindle connects with the inner race to couple power between the inner race and a second power element. A third rotatable power element spindle connects with the outer race to couple power between the outer race and a third power element. Means for adjusting axial separation adjust separation of the axially spaced parts of at least one of the races to vary a power split ratio between the first, second and third rotatable power element spindles.

35 Claims, 8 Drawing Sheets

POWER SPLIT DEVICE AND METHOD

CROSS-REFERENCE TO RELATED APPLICATION

This application is a continuation of and claims priority to PCT Application No. PCT/GB2008/003017 titled Power Split Device and Method, filed Sep. 5, 2008, which claims priority to Great Britain Application No. 0717354.5, filed Sep. 7, 2007.

BACKGROUND OF THE INVENTION

1. Field of the Invention

The present invention relates to a power split device and method.

2. Related Art

In multiple-power source devices, such as, for example, hybrid vehicles, arrangements exist to distribute power between elements of the vehicle. For example, it is known in a so-called "parallel" hybrid vehicle to provide a planetary gear power train which links an internal combustion engine, the driven road wheels and any electric machines. The planetary gear hybrid power train provides two power paths between the internal combustion engine and the driven road wheels. The first power path may be a mechanical coupling between the internal combustion engine and the driven wheels, whilst the second power path may be via a motor-generator and battery arrangement.

This approach enables the two power paths to be utilized under different conditions to improve the overall efficiency of the vehicle. However, whilst the planetary gear power train is simple and fairly efficient it suffers from a number of limitations. Accordingly, it is desired to provide an improved power split device.

SUMMARY OF THE INVENTION

According to a first aspect to the present invention there is provided a variable ratio power split device, comprising: radially inner and outer races, each comprising at least two axially spaced parts; a plurality of planetary members arranged for rolling contact between the inner and outer races; a planet follower carrier engaging with the planetary members; a first rotatable power element spindle connected with the planet follower and operable to couple power between the planet follower carrier and a first power element; a second rotatable power element spindle connected with the inner race and operable to couple power between the inner race and a second power element; a third rotatable power element spindle connected with the outer race and operable to couple power between the outer race and a third power element; and means for adjusting an axial separation of the axially spaced parts of at least one of the races to vary a power split ratio between the first, second and third rotatable power element spindles.

The first aspect recognizes that a limitation with the planetary gear hybrid power train mentioned above is that the elements coupled with the planetary gear hybrid power train are often not operating efficiently. For example, the internal combustion engine must always operate when the driven road wheels rotate above certain speeds which limits the potential of the vehicle to reduce emissions. Furthermore, the speed of the motor generators is directly dependent upon the speed of the internal combustion engine and/or the driven road wheels. Hence, it is unlikely that for any particular operating condition, the elements coupled with the power train can be operated efficiently. This is because the planetary gear hybrid power provides is a fixed power split ratio between the elements.

Accordingly, a variable ratio power split device is provided having inner and outer races, planetary members and a planet follower carrier is provided. Rotatable power element spindles are connected to each of the races and the planet follower carrier to couple power with respective power elements. By adjusting the axial separation of one of the races, the ratio of power distributed between the power element spindles is varied which improves the operability of the device.

In one embodiment, each of the first, second and third power elements have predetermined efficiency characteristics under predetermined operating conditions and the variable ratio power split device comprises: at least one sensor operable to determine current operating conditions; and a set-point unit operable to determine, with reference to stored data indicative of the predetermined efficiency characteristics, an axial separation of the axially spaced parts of at least one of the races to provide a power split ratio which improves an operating efficiency of at least one of the first, second and third power elements under the current operating conditions.

The sensors enable the current conditions to be established. By using knowledge of the characteristics of the power elements, an appropriate relationship of power distribution between the power elements can be set by adjusting the axial separation of the races. In this way, the differing operating requirements of the power element under the current operating conditions can be better balanced to improve the efficiency of at least one of the power elements.

In one embodiment, the device comprises: a plurality of the sensors and the set-point unit is operable to determine, with reference to the stored data indicative of the predetermined efficiency characteristics, an axial separation of the axially spaced parts of at least one of the races to provide a power split ratio which improves an operating efficiency of more than one of the first, second and third power elements under the current operating conditions.

Accordingly, the axial separation may be varied to provide an optimized efficiency of more than one of the power elements for the current operating conditions. It will be appreciated that in doing so the absolute optimum efficiency of one of the power elements may need to be reduced slightly in order to provide a significantly improved efficiency of one of the other power elements and thereby improve the overall efficiency of power elements coupled to the variable ratio power split device.

In one embodiment the set-point unit is operable to determine, with reference to the stored data indicative of the predetermined efficiency characteristics, an axial separation of the axially spaced parts of at least one of the races to provide a power split ratio which causes substantially no power to be coupled to one of the first, second and third power elements under the current operating conditions.

Accordingly, the axial separation may be adjusted to enable minimal power to be coupled to any of the first, second or third power elements. Power may then be distributed between the remaining two power elements without any power being provided to the third.

In one embodiment, the first, second and third power elements each comprise one of a prime mover, a vehicle transmission assembly and a power transmission assembly.

It will be appreciated that the vehicle transmission assembly may be a vehicle drive train.

In one embodiment, at least one of the power transmission assembly and the vehicle transmission assembly is operable to store power.

It will be appreciated that these assemblies may store power in a variety of ways such as, for example, mechanically, kinetically, chemically and hydraulically.

In one embodiment, the at least one of the power transmission assembly and the vehicle transmission assembly is operable to reapply the stored power.

Hence, the stored energy may be recovered from these assemblies and reused subsequently.

In one embodiment, the variable ratio power split device comprises a further power coupling and wherein the at least one of the power transmission assembly and the vehicle transmission assembly is operable to reapply the stored power via the further power coupling.

Accordingly, a separate path may exist whereby any power stored by these assemblies may be applied to each other, other than via the variable ratio power split device. For example, the power transmission assembly may store power and apply this directly to the vehicle transmission assembly via a power coupling other than by way of the planetary members to enable the power stored to be directly applied to the vehicle transmission assembly.

In one embodiment, the first power element comprises an internal combustion engine, the second power element comprises a vehicle transmission assembly and the third power element comprises a regenerative power assembly.

In one embodiment, the set-point unit is operable in any one of a number of modes and, when in a regenerative mode, is operable to determine, with reference to the stored data indicative of the predetermined efficiency characteristics, an axial separation of the axially spaced parts of at least one of the races to provide a power split ratio which causes minimal power to be coupled to the internal combustion engine and power from the vehicle transmission assembly to be provided to the regenerative power assembly at a speed which improves an operating efficiency of the regenerative power assembly under current operating conditions.

When in a regenerative or power storing mode, energy from the vehicle transmission assembly is diverted to the regenerative power assembly, typically to slow a vehicle, and the kinetic energy of the vehicle is then stored as potential energy in the regenerative power assembly. Typically, in such a mode it is desirable for minimal energy to be provided by the internal combustion engine, which may be inactivated during such braking. Also, it is desirable to operate the regenerative power assembly at a speed which maximizes the efficiency of this power storage. Accordingly, the axial separation of the races is adjusted in order to minimize any power being provided by or to the internal combustion engine and to operate the regenerative power assembly at a near constant efficient speed as the speed of the vehicle and hence the speed of the vehicle transmissions assembly reduces.

In one embodiment, the set-point unit is operable in any one of a number of modes and, when in a moving, high state of charge mode, is operable to determine, with reference to the stored data indicative of the predetermined efficiency characteristics, an axial separation of the axially spaced parts of at least one of the races to provide a power split ratio which causes power to be coupled from the internal combustion engine and the regenerative power assembly to the vehicle transmission assembly at a speed which improves an operating efficiency of at least one of the internal combustion engine and the regenerative power assembly under current operating conditions.

When the regenerative power assembly is in a high state of charge, there is little requirement to store any further energy in the regenerative power assembly. Accordingly, power can be utilized from both the internal combustion engine and the regenerative power supply, and applied to the vehicle transmission assembly to propel the vehicle as required. Hence, the axial separation of the races is adjusted to operate either and/or both the internal combustion engine and the regenerative power supply at a speed which improves their operating efficiency as the speed of the vehicle changes.

In one embodiment, the set-point unit is operable in any one of a number of modes and, when in a moving, low state of charge mode, is operable to determine, with reference to the stored data indicative of the predetermined efficiency characteristics, an axial separation of the axially spaced parts of at least one of the races to provide a power split ratio which causes power to be coupled from the internal combustion engine to the regenerative power assembly and the vehicle transmission assembly at a speed which improves an operating efficiency of at least one of the internal combustion engine and the regenerative power assembly under current operating conditions.

When the regenerative power assembly is in a low state of charge, any excess energy from the internal combustion energy may be converted to improve the state of charge of the regenerative power assembly. Accordingly, the axial separation of the races is adjusted to enable power to be supplied to the regenerative power supply at a speed which improves the operating efficiency of the regenerative power supply and/or the internal combustion engine.

In one embodiment, the set-point unit is operable in any one of a number of modes and, when in a zero emissions mode, is operable to determine, with reference to the stored data indicative of the predetermined efficiency characteristics, an axial separation of the axially spaced parts of at least one of the races to provide a power split ratio which causes minimal power to be coupled to the internal combustion engine and power from the regenerative power assembly to be provided to the vehicle transmission assembly at a speed which improves an operating efficiency of the regenerative power assembly under current operating conditions.

Hence, when it is desired to emit no emissions from the internal combustion engine, the axial separation of the races is set such that minimal power is provided from the internal combustion energy and the power for the vehicle transmission assembly is provided by the regenerative power assembly. Hence, the regenerative power assembly is operated at a speed which maximizes the efficiency of the power provided by the regenerative power assembly based on the speed of the vehicle transmission assembly, whilst minimizing any power from the internal combustion energy, which may be switched off.

In one embodiment, the set-point unit is operable in any one of a number of modes and, when in a stationary, low state of charge mode, is operable to determine, with reference to the stored data indicative of the predetermined efficiency characteristics, an axial separation of the axially spaced parts of at least one of the races to provide a power split ratio which causes minimal power to be provided to the vehicle transmission assembly and power from the internal combustion engine to be provided to the regenerative power assembly at a speed which improves an operating efficiency at least one of the internal combustion engine and the regenerative power assembly under current operating conditions.

When the regenerative power assembly is in a low state of charge and the vehicle is not moving, energy from the internal combustion energy may be converted to improve the state of charge of the regenerative power assembly. Accordingly, the axial separation of the races is adjusted to enable power to be supplied to the regenerative power supply at a speed which improves the operating efficiency of the regenerative power supply and/or the internal combustion engine.

In one embodiment, the set-point unit is operable in any one of a number of modes and, when in a moving, low state of charge mode, is operable to determine, with reference to the stored data indicative of the predetermined efficiency characteristics, an axial separation of the axially spaced parts of at least one of the races to provide a power split ratio which causes minimal power to be provided to the regenerative power assembly and power from the internal combustion engine to be provided to the vehicle transmission assembly at a speed which improves an operating efficiency of the internal combustion engine under current operating conditions.

When the regenerative power assembly is in a low state of charge, there is excess energy available in the regenerative power assembly. Accordingly, power can only be utilized from the internal combustion engine and applied to the vehicle transmission assembly to propel the vehicle as required. Hence, the axial separation of the races is adjusted to operate the internal combustion engine at a speed which improves its operating efficiency as the speed of the vehicle changes.

In one embodiment, the variable ratio power split device comprises: a transmission component and wherein at least one of the first, second and third rotatable power element spindles are connected with the transmission component.

Accordingly, a component may be provided between the power element spindles and the power elements.

In one embodiment, the transmission component comprises at least one of a gear train, a clutch and a brake.

In one embodiment, the first and second power element spindles are concentrically rotatable.

Providing concentrically rotatable spindles achieves a simple and compact construction of the variable ratio power split device whilst enabling power to be distributed between each the three power elements.

In one embodiment, the variable ratio power split device comprises: the first power element connected with the first rotatable power element spindle; the second power element connected with the second rotatable power element spindle; and the third power element connected with the first third power element spindle.

According to a second aspect of the present invention, there is provided a method of varying power, comprising the steps of: arranging a plurality of planetary members for rolling contact between radially inner and outer races, each race comprising at least two axially spaced parts; engaging a planet follower carrier with the planetary members; connecting the planet follower carrier, the inner race and the outer race with a respective one of a first power element, a second power element and a third power element; and adjusting an axial separation of the axially spaced parts of at least one of the races to vary a power split ratio between the first, second and third rotatable power element spindles.

In embodiments, there are provided method steps performed by the corresponding features of the first aspect.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION OF THE PREFERRED EMBODIMENTS

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Figure 1:
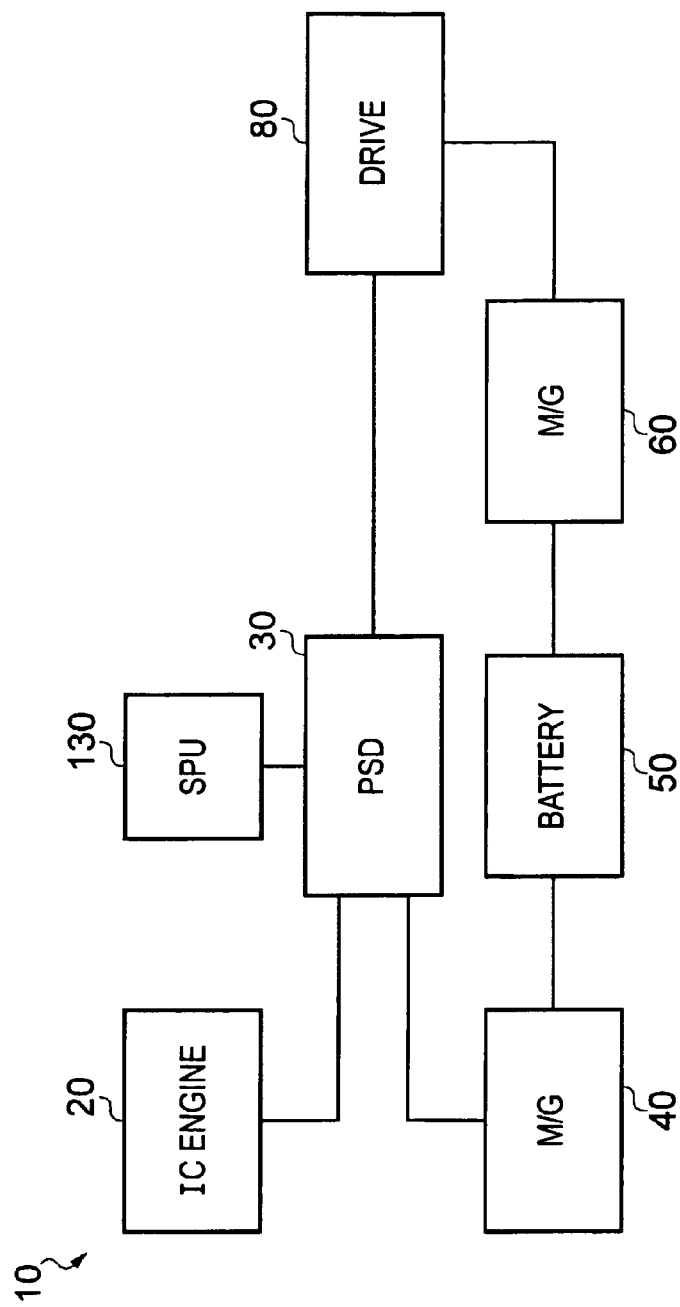
FIG. 1 illustrates a hybrid vehicle incorporating a power split device according to one embodiment.

FIG. 1 illustrates power elements of a typical hybrid vehicle, generally 10. The hybrid vehicle 10 is powered by an internal combustion engine 20 and a regenerative power assembly comprising a first motor generator 40, a battery 50 and a second motor generator 60. The internal combustion engine 20 is coupled with a power split device 30. Also coupled with the power split device 30 is the regenerative power assembly and a vehicle drive unit 80, such as the road wheels. The first motor generator 40 is coupled with the power split device 30 and the battery 50. The battery 50 is coupled with the second motor generator 60. The second motor generator 60 is coupled via a further power transfer path with the vehicle drive unit 80.

The power split device 30 controls the distribution of power between the internal combustion engine 20, the first motor generator 40 and the vehicle drive unit 80 by varying an axial separation of race components of the power split device 30, as will be explained in more detail below. The power split device 30 is controlled by a set-point unit 130 which determines the axial separation of the race components and thus the power split ratio between the power elements. The power split device 30 is operated in any one of a number of different operating modes which are selected based upon the current operating condition of the vehicle and the demands of the driver, as will also be explained in more detail below. The set-point unit 130 controls the power distribution of the power split device 30 in order to maximize the overall efficiency of the hybrid vehicle 10 by operating the power elements as near to their optimal efficiency for the current conditions as is possible. Hence, the power split device 30 can be considered to be analogous to an epicyclic transmission that can vary the ratio between each of the three components to allow each of these components to operate nearer to their respective optimal efficiencies. In other words, the power split device 30 operates as a floating three element epicyclic transmission having a variable ratio. Utilizing the power split device 30 as an epicyclic transmission allows the operating envelope to be extended due to the variable ratio capacity of the power split device. Also, the combination of the internal combustion engine 20, the vehicle drive unit 80, the regenerative power assembly and the power split device 30 can be considered to be analogous to an infinitely variable transmission.

Although the power elements of the hybrid vehicle 10 have been shown schematically as being coupled with each other, it will be appreciated that transmission components may be provided therebetween in order to provide for further power transmission control.

Figure 2:
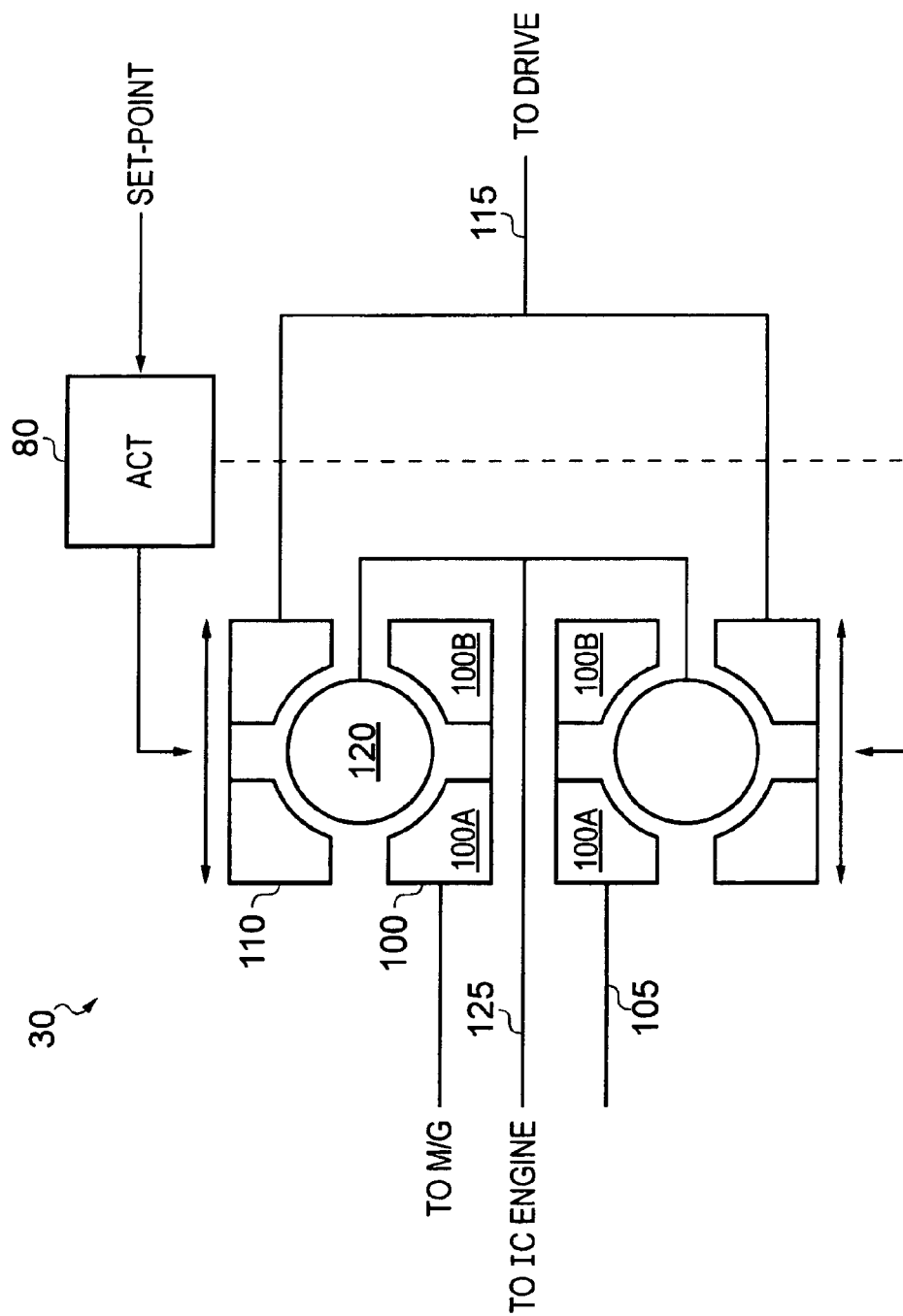
FIG. 2 illustrates the mechanical arrangement of the power split device of FIG. 1 in more detail.

FIG. 2 schematically illustrates in more detail the mechanical configuration of key components of the power split device 30. The power split device 30 comprises a radially inner race 100, a radially outer race 110 and, typically, three planetary members in rolling contact with both the inner race 100 and outer race 110. The planetary members each engage with a planet follower (not shown). The inner race 100 is comprised of two axially spaced components which are axially moveable relative to each other. Similarly, the outer race 110 is composed of two axially spaced components, also axially moveable relative to each other. Varying the axial separation of the components of the inner race 100 and/or the outer race 110 causes the planetary members to move radially within these races and varies the gear ratio of the power split device. Such an arrangement is shown generally in WO 99/35417. However, in the present arrangement, the planets followers (not shown) are coupled via a engine spindle 125 with the internal combustion engine 20, the inner race 100 is coupled via a motor generator spindle 105 with the motor generator 40 and the outer race 110 is coupled via a drive spindle 115 with the vehicle drive unit 80. Hence, each of the inner race, outer race and planets are free to rotate, rather than having at least one fixed component. In this arrangement, the engine spindle 125 and the motor generator spindle 105 are arranged to rotate concentrically. This provides a particularly compact and efficient arrangement. Also, as described in more detail below, the spindles 105, 11, 125 may be coupled with its associated power element via a transmission component such as a gear train, a clutch and/or a brake.

The power split device 30 also comprises an actuator 180 operable to vary the axial separation of the components of the outer race 110. The components of the inner race 100 are resiliently sprung to vary their axial separation in response to pressure from the planetary members 120, which varies the gear ratio of the power split device 30. In particular, the inner race 100 comprises two race components 100A, 100B which are engaged to the motor generator spindle 105 by means of a coupling comprising a helical interengagement in the form of a screw threaded engagement. The two race components 100A, 100B have oppositely handed threads so that a relative rotation of the motor generator spindle 105 and two race components 100A, 100B in one directional sense will cause the two components to be displaced towards one another whereas axial separation of the two race components 100A, 100B of the inner race 100 occurs where there is relative rotation between them and the motor generator spindle 105 in the opposite directional sense. The actuator 180 controls the axial separation of the components in response to a set-point signal provided by the set-point unit 130 and described in more detail below.

Hence, it can be seen that power can be distributed by the races 100, 110 and planetary members 120 of the power-split device 30 between the internal combustion engine 20, the motor generators 40 and the drive unit 80 via their respective spindles. Varying the axial separation of the components varies the ratio of power distribution between these components.

Figure 3:
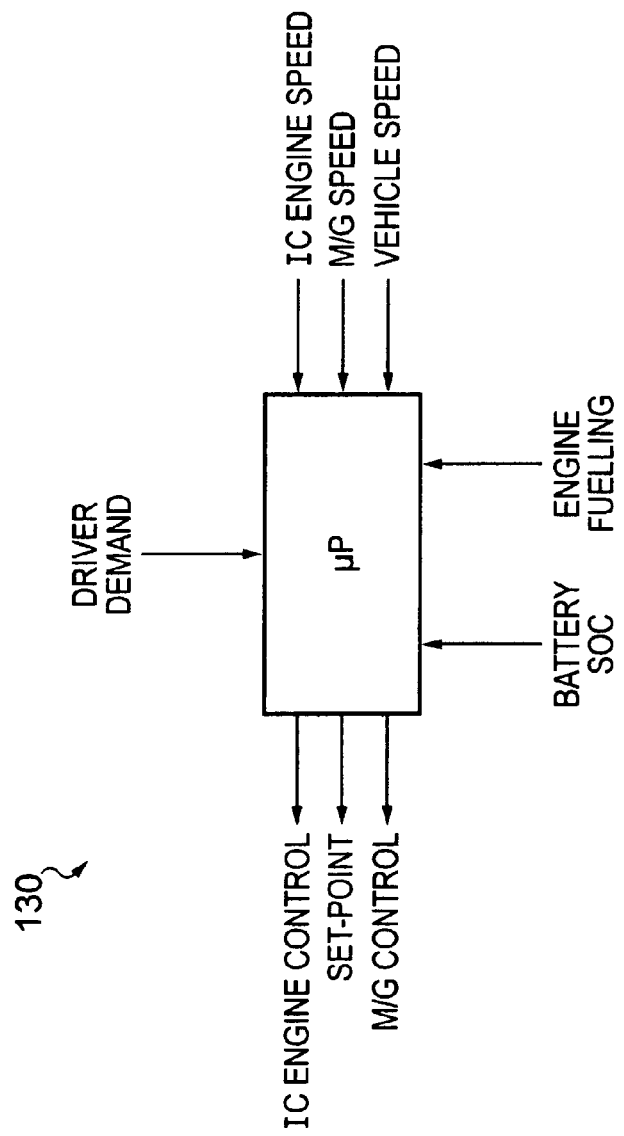
FIG. 3 illustrates a set-point unit of the power split device.

FIG. 3 illustrates the set-point unit 130 in more detail. The set-point unit 130 is typically implemented as a microprocessor having associated memory or as a state machine. The set-point unit 130 receives a number of inputs from sensors within the hybrid vehicle 10 and outputs a set-point signal which controls the axial separation of the components of the outer race 110, an internal combustion engine control signal which controls the load of the internal combustion engine 20 and a motor generator engine control signal which controls the load of the motor generator 40 to maximize the efficiency of the hybrid vehicle 10. Among the sensory inputs provided to the set-point unit 30 include the speed of the internal combustion engine 20, the speed of the motor generator 40, and the speed of the hybrid vehicle 10. Also provided to the set-point unit is the current state of charge of the battery 50, as well as the current engine fuelling arrangements for the internal combustion engine 20. Additionally, the set-point unit 130 is provided with details of the current demand being made by the driver of the hybrid vehicle 10, such as whether the driver is requesting more, the same or less power, as well as whether the driver wishes to slow the vehicle by braking, these signals are typically from accelerator pedal position sensors and brake pedal force sensors.

The set-point unit 130 executes an algorithm which determines an optimal axial separation of the components of the outer race 110, together with an internal combustion engine loading and/or a motor generator engine loading, where appropriate, to improve the efficiency of the hybrid vehicle 10 under the current operating conditions.

FIGS. 4a to 4d illustrate different operating modes of the power split device 30. The operating mode is determined based on the sensor information provided to the set-point unit 130.

Figure 4A:
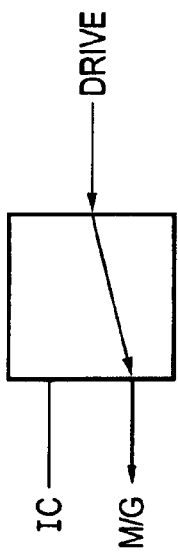
FIGS. 4*a* to 4*f* illustrate schematically power flows of the power split device when operating in different modes.

FIG. 4a illustrates the power flow during a regenerative braking mode. This mode is sensed when the driver demand input to the set-point unit 130 indicates that the driver wishes to slow the vehicle and the engine fuelling demand is at a minimum. When in this mode, the set-point unit 130 determines the current rotation speed of the drive spindle 115 based on the vehicle speed information and utilizes an algorithm to determine an axial separation of the components of the outer race 110 to provide a gear ratio which provides a substantially zero rotation speed for the engine spindle 125 whilst driving the motor generator spindle 105 at a speed which maximizes the generator efficiency based on the efficiency characteristics as shown in, for example, FIG. 8. The set-point unit 130 outputs a set-point signal to the actuator 180 to achieve this axial separation. As the vehicle slows the algorithm constantly adjusts the axial separation of the race components and in so doing adjusts the gear ratio to best satisfy these demands as closely as possible. In this way, substantially no power is provided to the internal combustion engine 20 during braking and the power from the vehicle drive unit 80 is transferred to the motor generator 40 at a speed which optimizes the efficiency of the motor generator 40. Hence, during regenerative braking minimal power is provided to the internal combustion engine 20 and instead maximum power is transferred to the motor generator 40 for storage in the battery 50.

Figure 4B:
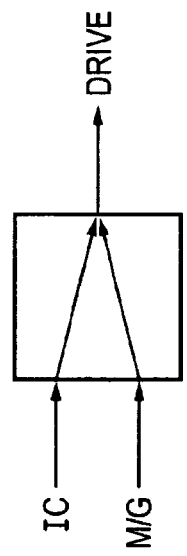

FIG. 4b illustrates the power flow during a moving, high state of charge mode. This mode is sensed when the driver demand input to the set-point unit 130 indicates that the driver wishes power to be applied to the vehicle drive unit 80, the vehicle speed information indicates that the vehicle speed is relatively high and the battery state of charge information indicates excess energy is available from the battery 50. When in this mode both the internal combustion engine 20 and the motor generator 40 are utilized to provide power to the drive unit 80. Hence, the set-point unit 130 determines the internal combustion engine speed and the motor generator speed as well as the vehicle speed and utilizes an algorithm to optimize the efficiency of the internal combustion engine 20 and the motor generator 40 to achieve the desired vehicle speed. This is achieved by varying the axial separation of the race components of the outer race 110 in order to vary the power provided by both the internal combustion engine 20 and the motor generator 40, together with varying the load of the internal combustion engine 20 and the load of the motor generator 40 in order to operate these at close to their optimal efficiency. The set-point unit 130 outputs a set-point signal to the actuator 180 to achieve this axial separation, together with an internal combustion engine control signal to achieve the desired load of the internal combustion engine 20 and/or a motor generator engine control signal to achieve the desired load of the motor generator 40, where appropriate. The internal combustion engine control signal is utilized by an internal combustion engine control unit (not shown) to control the internal combustion engine load using its throttle, fuel injection of other means depending on its type. The motor generator control signal is utilized by a motor generator control unit (not shown) to control the motor generator load, typically by controlling motor current. By varying the axial separation of the components of the outer race 110 the operating speed of the internal combustion engine 20 and the motor generator 40 can be changed such that they operate closer to the most efficient speeds. Clearly, where the demands are such that both cannot possibly be operated at their most efficient then the algorithm may apply weightings to favor operating either the internal combustion engine 20 or the motor generator 40 at their most efficient speeds. In general, where high fuel efficiency is desired, the algorithm will favor operating the internal combustion engine 20 at its most efficient point.

Figure 4C:
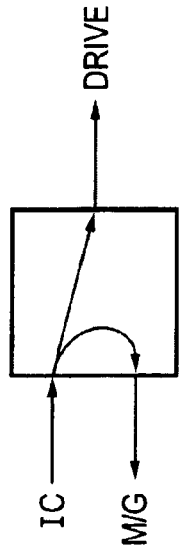

FIG. 4c illustrates the power flow during a moving, low state of charge mode. This mode is sensed when the driver demand input to the set-point unit 130 indicates that the driver wishes power to be applied to the vehicle drive unit 80 and the battery state of charge information indicates the battery 50 is low on energy. When in this mode the internal combustion engine 20 is utilized to provide power to the drive unit 80 and the motor generator 40. Accordingly, the set-point unit 130 changes the axial separation of the race components of the outer race 110 to operate the internal combustion engine 20 at its most efficient speed and to divert some of the excess power away from the drive unit 80 and into the motor generator 40. This is achieved by varying the axial separation of the race components of the outer race 110 in order to vary the power provided by the internal combustion engine 20 to the vehicle drive unit 80 and the motor generator 40, together with varying the load of the internal combustion engine 20. The set-point unit 130 outputs a set-point signal to the actuator 180 to achieve this axial separation, together with an internal combustion engine control signal to achieve the desired load of the internal combustion engine 20. Although the algorithm will seek to drive the motor generator 40 at the most efficient speed possible, once again a weighting will typically be applied to favor operating the internal combustion engine 20 at its most efficient speed. In this way, it can be seen that the axial separation of the race components of the outer race 110 of the power split device 30 can be varied to divert power from the internal combustion engine 20 when operating at its most efficient point and into the regenerative power assembly.

Figure 4D:
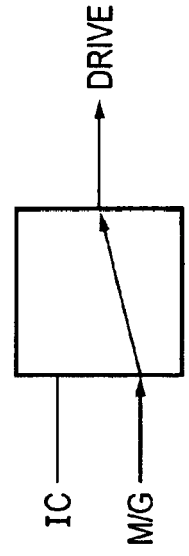

FIG. 4d illustrates the power flow during a zero emission mode. This mode is sensed when the driver demand input to the set-point unit 130 indicates that the driver wishes power to be applied to the vehicle drive unit 80, the vehicle speed information indicates that the vehicle speed is relatively low and the battery state of charge information indicates excess energy is available from the battery 50. When in this mode the motor generator 40 is utilized to provide power to the drive unit 80. Accordingly, the set-point unit 130 changes the axial separation of the components of the outer race 110 to enable the internal combustion engine 20 to be switched off and power to be supplied from the motor generator 40 instead. The set-point unit 130 outputs a set-point signal to the actuator 180 to achieve this axial separation, together with a motor generator engine control signal to achieve the desired load of the motor generator 40. The axial separation will be set to attempt to operate the motor generator 40 at the most efficient speed possible for the current conditions. The variable ratio provided by the power split device 30, enable the motor generator 40 to be utilized to propel the hybrid vehicle 10 for a much wider range of speeds than would otherwise be possible.

Figure 4E:
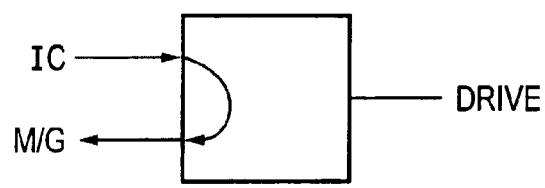

FIG. 4e illustrates the power flow during a stationary, low state of charge mode. This mode is sensed when the driver demand input to the set-point unit 130 indicates that the vehicle 10 is stationary and the battery state of charge information indicates the battery 50 is low on energy. When in this mode the internal combustion engine 20 is utilized to provide power to the motor generator 40. Accordingly, the set-point unit 130 changes the axial separation of the race components of the outer race 110 to operate the internal combustion engine 20 at its most efficient speed and supply the excess power into the motor generator 40 with substantially no power being supplied to the vehicle drive unit 80. This is achieved by varying the axial separation of the race components of the outer race 110 in order to vary the power provided by the internal combustion engine 20 to the vehicle drive unit 80 and the motor generator 40, together with varying the load of the internal combustion engine 20. The set-point unit 130 outputs a set-point signal to the actuator 180 to achieve this axial separation, together with an internal combustion engine control signal to achieve the desired load of the internal combustion engine 20. Although the algorithm will seek to drive the motor generator 40 at the most efficient speed possible, once again a weighting will typically be applied to favor operating the internal combustion engine 20 at its most efficient speed. In this way, it can be seen that the axial separation of the race components of the outer race 110 of the power split device 30 can be varied to provide power from the internal combustion engine 20 when operating at its most efficient point into the regenerative power assembly.

Figure 4F:
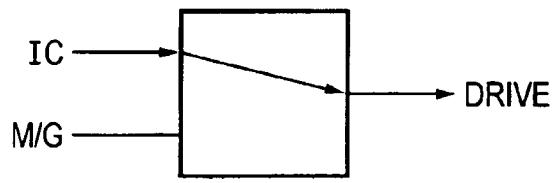

FIG. 4f illustrates the power flow during a moving, low state of charge mode. This mode is sensed when the driver demand input to the set-point unit 130 indicates that the driver wishes power to be applied to the vehicle drive unit 80, the vehicle speed information indicates that the vehicle speed is relatively high and the battery state of charge information indicates no excess energy is available from the battery 50. When in this mode only the internal combustion engine 20 is utilized to provide power to the drive unit 80. Hence, the set-point unit 130 determines the internal combustion engine speed as well as the vehicle speed and utilizes an algorithm to optimize the efficiency of the internal combustion engine 20 to achieve the desired vehicle speed. This is achieved by varying the axial separation of the race components of the outer race 110 in order to vary the power provided by the internal combustion engine 20, together with varying the load of the internal combustion engine 20 in order to operate this at close to its optimal efficiency. The set-point unit 130 outputs a set-point signal to the actuator 180 to achieve this axial separation, together with an internal combustion engine control signal to achieve the desired load of the internal combustion engine 20. By varying the axial separation of the components of the outer race 110, the operating speed of the internal combustion engine 20 can be changed such that it operates closer to its most efficient speed.

Figure 5:
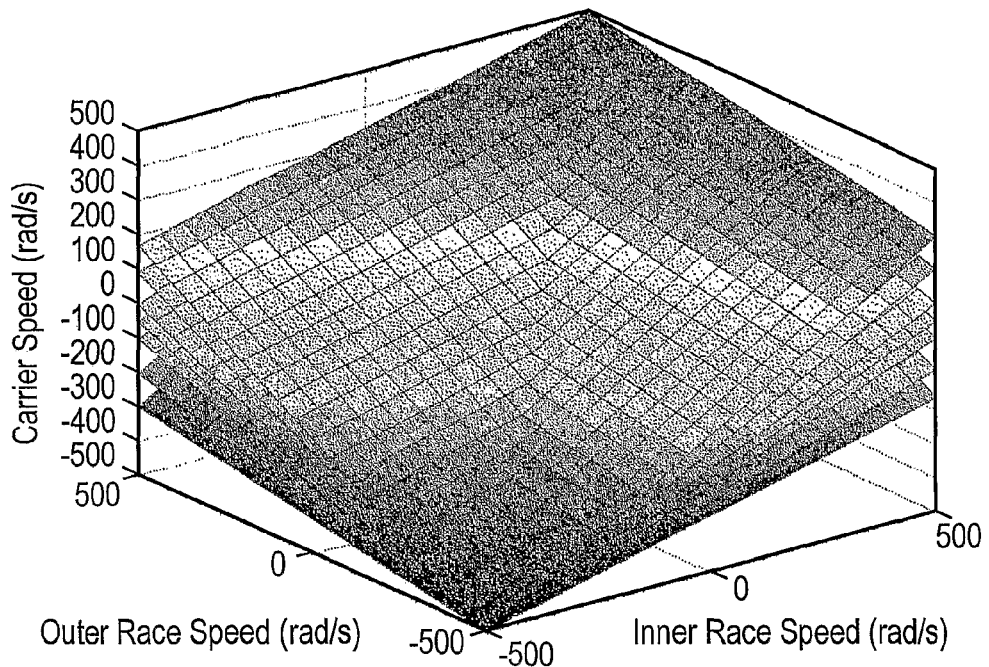
FIG. 5 is a graph showing an example relationship between the rotational speed of the components of the power split device when operating at any one of a number of different gearing ratios.

FIG. 5 illustrates the speed ratio relationship between elements of a typical power split device 30. A traditional floating epicyclic gear train has 3 elements that rotate about the principle axis of the transmission, the sun, the carrier and the annulus. The speed of these elements are related to each other by the following relationship:

$$\omega_{sun} = \omega_{carrier}(1+i) - i\omega_{annulus},$$

where the epicyclic ratio is specified as:

$$i = \frac{D_a}{D_s}.$$

For a typical existing hybrid vehicle, the epicyclic ratio is around 78/30=2.6. Similarly the torque relationship is as follows:

$$Tq_{sun} = Ft_{sun} R_{sun} N_{planets}$$

$$Ft_{annulus} = Ft_{sun}$$

$$Tq_{annulus} = Ft_{sun} R_{annulus} N_{planets}$$

$$Tq_{carrier} = -(2Ft_{sun})\left(\frac{R_{annulus} + R_{sun}}{2}\right) N_{planets}$$

where $N_{planets}$ is the number of planet elements, Ft is the tooth/traction force and $R_{subscripts}$ are the radii of the specific geometry described by the subscript.

Hence:

$$\frac{Tq_{sun}}{R_{sun}} = \frac{Tq_{annulus}}{R_{annulus}} = \frac{-Tq_{carrier}}{R_{annulus} + R_{sun}}$$

For the power split device 30, the equation relating the speed of each element may be derived as:

$$\omega_{carrier} = \frac{\left(R_{cont,in}\omega_{in} + \frac{R_{planet,in} R_{cont,out}}{R_{planet,out}}\omega_{outer}\right)}{\left(R_{cont,in} + \frac{R_{planet,in} R_{cont,out}}{R_{planet,out}}\right)},$$

where the values of radius all vary depending on the specific design geometry and current instantaneous speed ratio of the power split device 30. The torque relationships on each element of the power split device 30 are as follows:

$$Tq_{in} = Ft_{in} R_{cont,in} N_{planets}$$

$$Ft_{out} = R_{planet,out} = Ft_{in} R_{planet,in}$$

$$Tq_{out} = Ft_{out} R_{cont,out} N_{planets}$$

$$Tq_{carrier} = -(Ft_{in} + Ft_{out}) R_{orbit} N_{planets}$$

$$\frac{Tq_{in}}{R_{cont,in}} = \frac{Tq_{out} R_{planet,out}}{R_{cont,out} R_{planet,in}} = \frac{-Tq_{carrier}}{R_{orbit}\left(1 + \frac{R_{planet,in}}{R_{planet,out}}\right)}$$

It will be appreciated that utilizing the power split device 30 as an epicyclic transmission allows the operating envelope of the hybrid vehicle to be extended further due to the variable ratio capability of the power split device 30.

Each of the planes of the graph in FIG. 5 shows the relationship at one particular discrete ratio. The graph shows how the iso-ratio conditions pass through each other when all the components become synchronous. The upper and lower planes of the graph show a complete envelope of relationships possible at different axial separations of the races. The ratio of the power split device 30 dictates the tilt angle of each of the iso-ratio planes. This information is stored by the set-point unit 130 and is utilized by its algorithms. It will be appreciated that a fixed ratio epicyclic gear train would only be able to achieve one of these planes, rather than the operating envelope contained within the upper and lower bounding planes.

Figure 6:
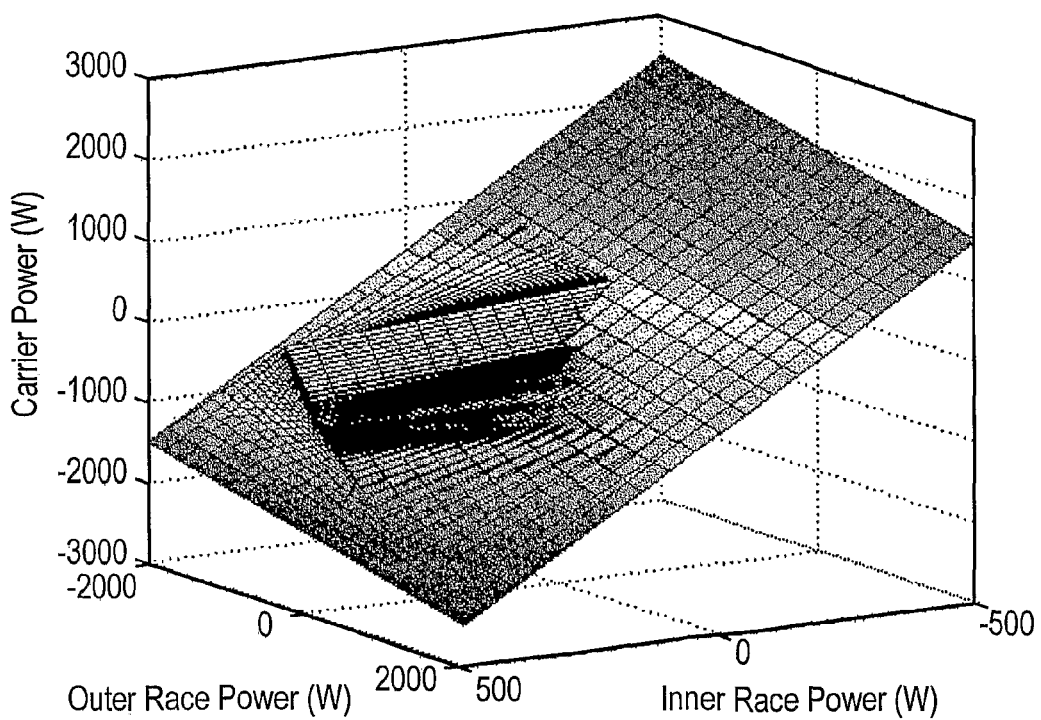
FIG. 6 illustrates an example power flow on each component of the power split device.

FIG. 6 illustrates the power flow on each component of the power split device 30 assuming a unity torque applied to the inner race 100. Clearly the power split device 30 acts as a summing junction for power transmitted (as would be the case with a fixed ratio epicyclic), although the variable ratio nature of the power split device 30 allows this power split to be varied significantly thus allowing more or less engine power to be delivered to either the electric elements or mechanical elements of the hybrid vehicle 10. Once again, this information is stored by the set-point unit 130 and utilized by its algorithms.

Figure 7:
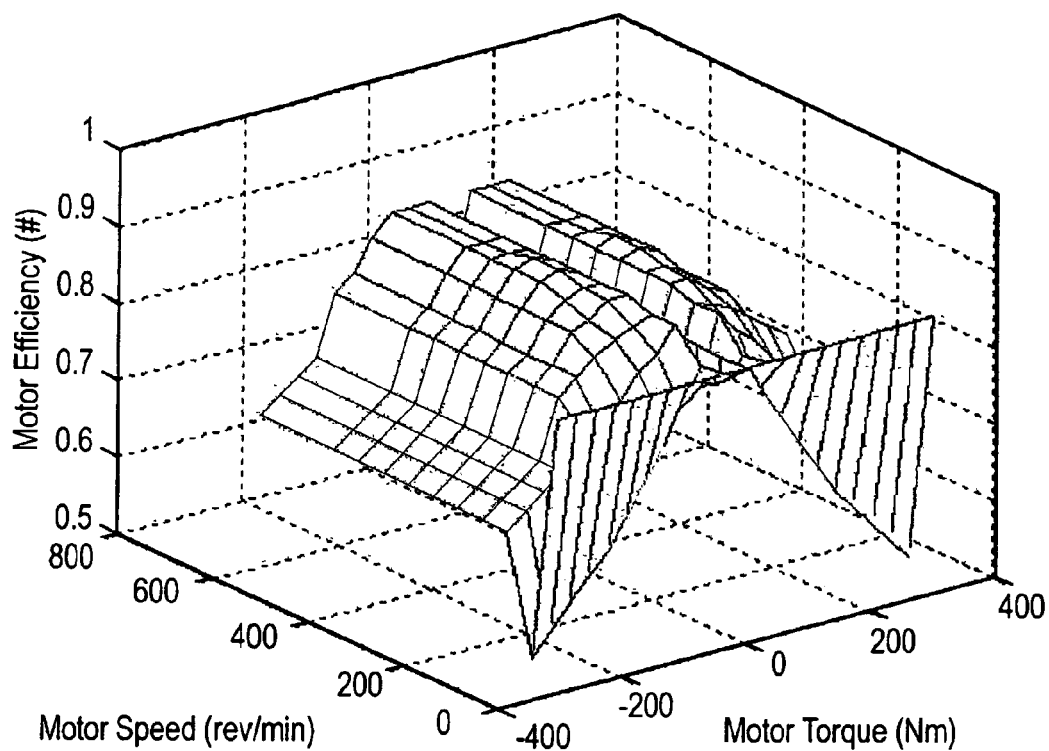
FIG. 7 shows an example motor efficiency characteristic a typical permanent magnet motor/generator.

FIG. 7 illustrates typical motor efficiency characteristics or the motor generator 40. There is a rapid degradation in electric machine efficiency it is operated away from ideal operating points. Significant overall vehicle efficiency may be achieved by controlling the electric machines to operate at speed and torque conditions that improve their efficiencies. The variable ratio provided by the power split device 30 allows this improved control to be achieved. These characteristics are also stored by the set-point unit 130 and utilized by its algorithms.

Figure 8:
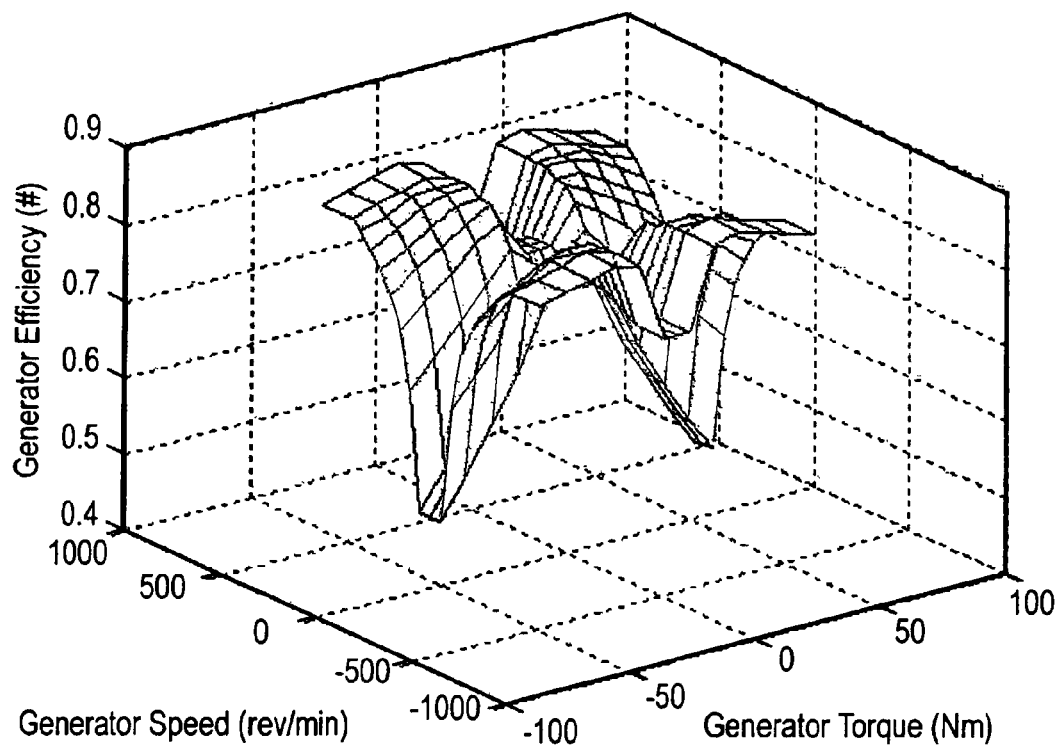
FIG. 8 shows an example generator efficiency characteristics of the typical permanent magnet motor/generator.

FIG. 8 illustrates generator efficiency characteristics of the motor generator 40. This information is stored by the set-point unit 130 and utilized by its algorithms.

Figure 9:
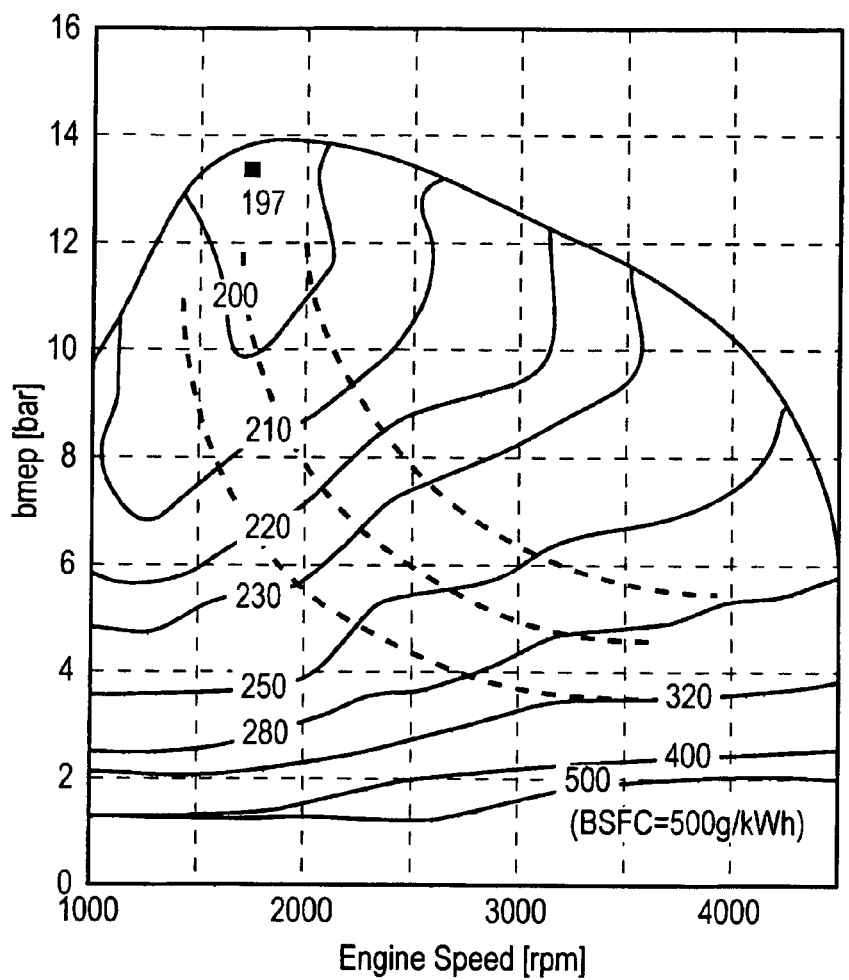
FIG. 9 illustrates an example efficiency characteristic of a typical internal combustion engine.

FIG. 9 illustrates typical efficiency characteristics of the internal combustion engine 20. The efficiency is described by Brake specific fuel consumption contours. As can be seen the internal combustion engine 20 operates near its peak efficiency when at low speed and high load. Again, this information is stored by the set-point unit 130 and utilized by its algorithms.

As can be seen, this arrangement can be utilized to enable a hybrid vehicle 10 to operate at higher road speeds without having to activate the internal combustion engine 20 through the use of the variable gearing provided by the power split device 30. This reduces the amount of carbon emissions made by the vehicle. Also, the variable ratio nature of the power split device 30 enables the internal combustion engine 20 and machine generator 40 to be operated under conditions which better match each units individual characteristics and improve their efficiency.

Although particular embodiments have been described herein it would be apparent that the invention is not limited thereto and that many modifications and additions may be made within the scope of the invention as defined in the claims. For example, various combinations of features from the following dependent claims could be made with features of the independent claims without departing from the scope of the present invention.

What is claimed is:

1. A variable ratio power split device, comprising:
   radially inner and outer races, each comprising at least two axially spaced parts;
   a plurality of planetary members arranged for rolling contact between said inner and outer races;
   a planet follower carrier engaging with said planetary members;
   a first rotatable power element spindle connected with said planet follower carrier and operable to couple power between said planet follower carrier and a first power element;
   a second rotatable power element spindle connected with said inner race and operable to couple power between said inner race and a second power element;
   a third rotatable power element spindle connected with said outer race and operable to couple power between said outer race and a third power element; and
   means for adjusting an axial separation of said axially spaced parts of at least one of said races to vary a power split ratio between said first, second and third rotatable power element spindles.

2. The variable ratio power split device of claim 1, wherein each of said first, second and third power elements have predetermined efficiency characteristics under predetermined operating conditions and said variable ratio power split device comprises:
   at least one sensor operable to determine current operating conditions; and
   a set-point unit operable to determine, with reference to stored data indicative of said predetermined efficiency characteristics, an axial separation of said axially spaced parts of at least one of said races to provide a power split ratio which improves an operating efficiency of at least one of said first, second and third power elements under said current operating conditions.

3. The variable ratio power split device of claim 2, comprising a plurality of said sensors and wherein said set-point unit is operable to determine, with reference to said stored data indicative of said predetermined efficiency characteristics, an axial separation of said axially spaced parts of at least one of said races to provide a power split ratio which improves an operating efficiency of more than one of said first, second and third power elements under said current operating conditions.

4. The variable ratio power split device of claim 2, wherein said set-point unit is operable to determine, with reference to said stored data indicative of said predetermined efficiency characteristics, an axial separation of said axially spaced parts of at least one of said races to provide a power split ratio which causes substantially no power to be coupled to one of said first, second and third power elements under said current operating conditions.

5. The variable ratio power split device of claim 1, wherein said first, second and third power elements each comprise one of a prime mover, a vehicle transmission assembly and a power transmission assembly.

6. The variable ratio power split device of claim 5, wherein at least one of said power transmission assembly and said vehicle transmission assembly are operable to store power.

7. The variable ratio power split device of claim 6, comprising a further power coupling and wherein said at least one of said power transmission assembly and said vehicle transmission assembly is operable to reapply said stored power via said further power coupling.

8. The variable ratio power split device of claim 6, wherein said first power element comprises an internal combustion engine, said second power element comprises a vehicle transmission assembly and said third power element comprises a regenerative power assembly.

9. The variable ratio power split device of claim 8, wherein said set-point unit is operable in any one of a number of modes and, when in a regenerative mode, is operable to determine, with reference to said stored data indicative of said predetermined efficiency characteristics, an axial separation of said axially spaced parts of at least one of said races to provide a power split ratio which causes minimal power to be coupled to said internal combustion engine and power from said vehicle transmission assembly to be provided to said regenerative power assembly at a speed which improves an operating efficiency of said regenerative power assembly under current operating conditions.

10. The variable ratio power split device of claim 8, wherein said set-point unit is operable in any one of a number of modes and, when in a moving, high state of charge mode, is operable to determine, with reference to said stored data indicative of said predetermined efficiency characteristics, an axial separation of said axially spaced parts of at least one of said races to provide a power split ratio which causes power to be coupled from said internal combustion engine and said regenerative power assembly to said vehicle transmission assembly at a speed which improves an operating efficiency of at least one of said internal combustion engine and said regenerative power assembly under current operating conditions.

11. The variable ratio power split device of claim 8, wherein said set-point unit is operable in any one of a number of modes and, when in a moving, low state of charge mode, is operable to determine, with reference to said stored data indicative of said predetermined efficiency characteristics, an axial separation of said axially spaced parts of at least one of said races to provide a power split ratio which causes power to be coupled from said internal combustion engine to said regenerative power assembly and said vehicle transmission assembly at a speed which improves an operating efficiency of at least one of said internal combustion engine and said regenerative power assembly under current operating conditions.

12. The variable ratio power split device of claim 8, wherein said set-point unit is operable in any one of a number of modes and, when in a zero emissions mode, is operable to determine, with reference to said stored data indicative of said predetermined efficiency characteristics, an axial separation of said axially spaced parts of at least one of said races to provide a power split ratio which causes minimal power to be coupled to said internal combustion engine and power from said regenerative power assembly to be provided to said vehicle transmission assembly at a speed which improves an operating efficiency of said regenerative power assembly under current operating conditions.

13. The variable ratio power split device of claim 8, wherein said set-point unit is operable in any one of a number of modes and, when in a stationary, low state of charge mode, is operable to determine, with reference to said stored data indicative of said predetermined efficiency characteristics, an axial separation of said axially spaced parts of at least one of said races to provide a power split ratio which causes minimal power to be provided to said vehicle transmission assembly and power from said internal combustion engine to be provided to said regenerative power assembly at a speed which improves an operating efficiency at least one of said internal combustion engine and said regenerative power assembly under current operating conditions.

14. The variable ratio power split device of claim 8, wherein said set-point unit is operable in any one of a number of modes and, when in a moving, low state of charge mode, is operable to determine, with reference to said stored data indicative of said predetermined efficiency characteristics, an axial separation of said axially spaced parts of at least one of said races to provide a power split ratio which causes minimal power to be provided to said regenerative power assembly and power from said internal combustion engine to be provided to said vehicle transmission assembly at a speed which improves an operating efficiency of said internal combustion engine under current operating conditions.

15. The variable ratio power split device of claim 5, wherein said at least one of said power transmission assembly and said vehicle transmission assembly are operable to store power and to reapply said stored power.

16. The variable ratio power split device of claim 1, comprising a transmission component and wherein at least one of said a first, second and third rotatable power element spindles are connected with said transmission component.

17. The variable ratio power split device of claim 16, wherein said transmission component comprises at least one of a gear train, a clutch and a brake.

18. The variable ratio power split device of claim 1, wherein said first and second power element spindles are concentrically rotatable.

19. The variable ratio power split device of claim 1, comprising:
said first power element connected with said first rotatable power element spindle;
said second power element connected with said second rotatable power element spindle; and
said third power element connected with said third power element spindle.

20. A method of varying power, comprising the steps of:
arranging a plurality of planetary members for rolling contact between radially inner and outer races, each race comprising at least two axially spaced parts;
engaging a planet follower carrier with said planetary members;
connecting said planet follower carrier, said inner race and said outer race with a respective one of a first power element, a second power element and a third power element; and
adjusting an axial separation of said axially spaced parts of at least one of said races to vary a power split ratio between said first, second and third rotatable power element spindles.

21. The method of claim 20, wherein each of said first, second and third power elements have predetermined efficiency characteristics under predetermined operating conditions and said method comprises the steps of:
a) determining current operating conditions; and
b) determining, with reference to stored data indicative of said predetermined efficiency characteristics, an axial separation of said axially spaced parts of at least one of said races to provide a power split ratio which improves an operating efficiency of at least one of said first, second and third power elements under said current operating conditions.

22. The method of claim 21, wherein said step b) comprises determining, with reference to said stored data indicative of said predetermined efficiency characteristics, an axial separation of said axially spaced parts of at least one of said races to provide a power split ratio which improves an operating efficiency of more than one of said first, second and third power elements under said current operating conditions.

23. The method of claim 21, wherein said first power element comprises an internal combustion engine, said second power element comprises a vehicle transmission assembly and said third power comprises a regenerative power assembly.

24. The method of claim 23, wherein said step b) comprises the step of determining, with reference to said stored data indicative of said predetermined efficiency characteristics, an axial separation of said axially spaced parts of at least one of said races to provide a power split ratio which causes minimal power to be coupled to said internal combustion engine and power from said vehicle transmission assembly to be provided to said regenerative power assembly at a speed which improves an operating efficiency of said regenerative power assembly under current operating conditions.

25. The method of claim 23, wherein said step b) comprises the step of determining, with reference to said stored data indicative of said predetermined efficiency characteristics, an axial separation of said axially spaced parts of at least one of said races to provide a power split ratio which causes power to be coupled from said internal combustion engine and said regenerative power assembly to said vehicle transmission assembly at a speed which improves an operating efficiency of at least one of said internal combustion engine and said regenerative power assembly under current operating conditions.

26. The method of claim 23, wherein said step b) comprises the step of determining, with reference to said stored data indicative of said predetermined efficiency characteristics, an axial separation of said axially spaced parts of at least one of said races to provide a power split ratio which causes power to be coupled from said internal combustion engine to said regenerative power assembly and said vehicle transmission assembly at a speed which improves an operating efficiency of at least one of said internal combustion engine and said regenerative power assembly under current operating conditions.

27. The method of claim 23, wherein said step b) comprises the step of determining, with reference to said stored data indicative of said predetermined efficiency characteristics, an axial separation of said axially spaced parts of at least one of said races to provide a power split ratio which causes minimal power to be coupled to said internal combustion engine and power from said regenerative power assembly to be provided to said vehicle transmission assembly at a speed which improves an operating efficiency of said regenerative power assembly under current operating conditions.

28. The method of claim 23, wherein said step b) comprises the step of determining, with reference to said stored data indicative of said predetermined efficiency characteristics, an axial separation of said axially spaced parts of at least one of said races to provide a power split ratio which causes minimal power to be provided to said vehicle transmission assembly and power from said internal combustion engine to be provided to said regenerative power assembly at a speed which improves an operating efficiency at least one of said internal combustion engine and said regenerative power assembly under current operating conditions.

29. The method of claim 23, wherein said step b) comprises the step of determining, with reference to said stored data indicative of said predetermined efficiency characteristics, an axial separation of said axially spaced parts of at least one of said races to provide a power split ratio which causes minimal power to be provided to said regenerative power assembly and power from said internal combustion engine to be provided to said vehicle transmission assembly at a speed which improves an operating efficiency of said internal combustion engine under current operating conditions.

30. The method of claim 20, wherein said step b) comprises determining, with reference to said stored data indicative of said predetermined efficiency characteristics, an axial separation of said axially spaced parts of at least one of said races to provide a power split ratio which causes no power to be coupled to one of said first, second and third power elements under said current operating conditions.

31. The method of claim 20, comprising the step of storing power using at least one of said first, second and third power elements.

32. The method of claim 31, comprising the step of reapplying said stored power.

33. The method of claim 32, wherein said step of reapplying comprises reapplying said stored power from said at least one of said first, second and third power elements to another of said first, second and third power elements other than via said planetary members.

34. The method of claim 20, comprising the step of connecting a transmission component between at least one of said planet follower carrier, said inner race and said outer race with said respective one of a first power element, a second power element and a third power element.

35. A variable ratio power split device that is included in a hybrid vehicle, comprising:
   radially inner and outer races, each comprising at least two axially spaced parts;
   a plurality of planetary members arranged for rolling contact between said inner and outer races;
   a planet follower carrier engaging with said planetary members;
   a first rotatable power element spindle connected with said planet follower carrier and operable to couple power between said planet follower carrier and a first power element;
   a second rotatable power element spindle connected with said inner race and operable to couple power between said inner race and a second power element;
   a third rotatable power element spindle connected with said outer race and operable to couple power between said outer race and a third power element; and
   means for adjusting an axial separation of said axially spaced parts of at least one of said races to vary a power split ratio between said first, second and third rotatable power element spindles, wherein the power split device is part of and coupled to the hybrid vehicle.

* * * * *